Feb. 24, 1970 L. HIDEG 3,497,186
SINGLE FUEL SYSTEM CARBURETOR
Filed April 8, 1968 2 Sheets-Sheet 1

LASZLO HIDEG
INVENTOR

BY John R. Faulkner
Glenn S. Arendsen
ATTORNEYS

Feb. 24, 1970 L. HIDEG 3,497,186
SINGLE FUEL SYSTEM CARBURETOR
Filed April 8, 1968 2 Sheets-Sheet 2

IDLING 20°   WOT
THROTTLE BLADE OPENING

LASZLO HIDEG
INVENTOR

BY
ATTORNEYS

United States Patent Office 3,497,186
Patented Feb. 24, 1970.

3,497,186
SINGLE FUEL SYSTEM CARBURETOR
Laszlo Hideg, Dearborn Heights, Mich., assignor to Ford Motor Company, Dearborn, Mich., a corporation of Delaware
Filed Apr. 8, 1968, Ser. No. 719,480
Int. Cl. F02m *37/00, 59/20*
U.S. Cl. 261—50                                    12 Claims

ABSTRACT OF THE DISCLOSURE

Fuel for engine operation is drawn initially into a metering chamber separated from the venturi of the carburetor and is then passed into the carburetor venturi. A metering rod is positioned in the fuel flow passage leading to the metering chamber and the quantity of fuel supplied to an engine is a function of the metering signal and the restriction to fuel flow throughout all phases of engine operation. In one construction, the metering signal is varied by a combination of the vacuum signals in the carburetor air horn, adjacent an edge of the throttle blade, and in the intake manifold, and the fuel flow restriction is held constant for low throttle blade openings and decreased at higher blade openings. An alternative construction uses a single metering rod to vary continuously the metering signal and the fuel flow restriction.

SUMMARY OF THE INVENTION

Virtually all carburetors presently being produced contain two fuel metering systems, one for supplying idling fuel and another for supplying main operating fuel. As the engine passes through the transition zone between idling and road operation, each fuel metering system supplies a part of the fuel requirements. Proper calibration is extremely difficult during this dual metering phase, especially where one system is supplying only a small portion of the fuel requirements.

The carburetor of this invention eliminates the inherent difficulties of the dual metering system by providing a single fuel metering system for all phases of engine operation. A metering chamber located in the carburetor body but separated from the carburetor induction passage serves as the heart of the single fuel system. A passage connects the metering chamber with the induction passage and transmits a vacuum signal from the induction passage to the metering chamber. In the metering chamber, the vacuum signal is modulated into a metering signal by at least one air bleed passage. Fuel is drawn into the metering chamber in response to the metering signal existing therein and then into the carburetor induction passage. A metering rod located in the passage supplying fuel to the metering chamber is positioned according to the position of the throttle blade. Throughout all phases of engine operation, the quantity of fuel delivered to the induction passage is a function of the metering signal and the restriction provided by the metering rod to fuel flowing into the metering chamber.

In one construction, no change takes place in the metering relationship of the rod to a metering jet during low throttle blade openings up to about 20°. At greater throttle blade openings, a tapered portion of the metering rod moves into a metering relationship with the jet to decrease fuel flow resistance. During engine idling and low speed operation, the metering signal existing in the metering chamber varies to change the amount of fuel provided to the engine. For high speed engine operation, fuel still passes through the metering chamber but its flow rate is determined by a combination of the metering signal and the restriction to fuel flowing into the metering chamber.

An alternate construction varies both the metering signal and the fuel flow resistance continuously with throttle blade movement. A single metering rod then can be used to control both signals.

A mechanism responsive to the low manifold vacuum existing when an enriched fuel-air ratio is required for high power can be used to increase the metering signal and thereby produce the desired enrichment. Such a mechanism typically comprises a second air bleed passage for the metering chamber with a piston responsive to intake manifold vacuum for decreasing air flow through the second bleed passage at low manifold vacuum.

DETAILED DESCRIPTION

Figure 1:
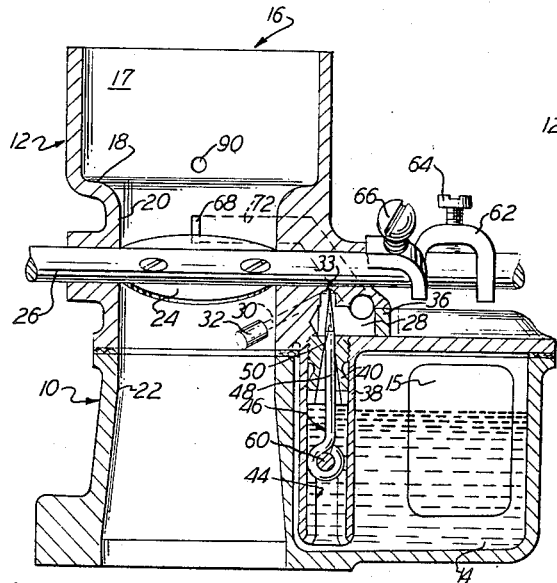
FIGURE 1 is a sectioned elevation of a carburetor of this invention in which the fuel flow restriction is held constant for small openings of the throttle blade. The components are shown in the idling position and the structural relationship of the metering chamber to the induction passage also is presented.
Figure 2:
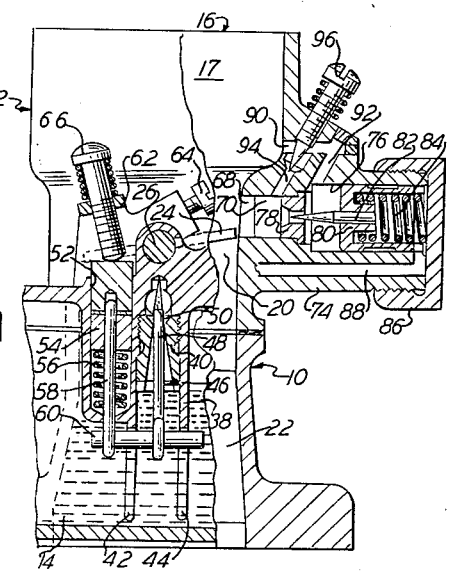
FIGURE 2 is a side elevation of the carburetor of FIGURE 1 showing the air bleed passages used to establish the metering signal and showing the linkage connecting the metering rod to the throttle blade.
Figure 4:
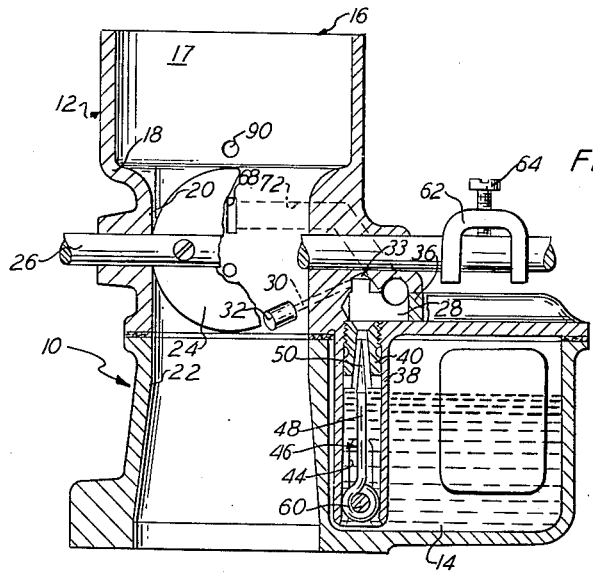
FIGURE 4 is a sectioned elevation similar to FIGURE 1 but with the components in the wide-open throttle position.
Figure 3:
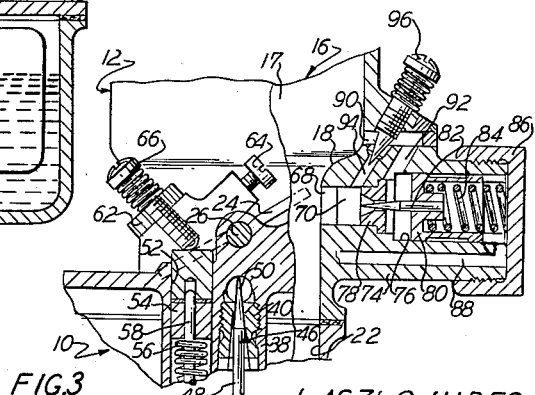
FIGURE 3 is a sectioned elevation similar to FIGURE 2 but with the components at the point where the greater portion of fuel metering control is passing from the vacuum signal existing in the metering chamber to the metering rod.

Referring to FIGURES 1 and 2, a carburetor body made up of a lower portion 10 and an upper portion 12 has a fuel bowl 14 located in the lower portion and an induction passage 16 passing through both the lower and upper portions. Fuel bowl 14 contains a float 15 that operates a conventional valve mechanism (not shown) to control the fuel level in the bowl. Induction passage 16 contains an air horn 17 and a venturi section having a converging portion 18, a throat 20, and a diverging portion 22. Throat 20 is considerably longer than the conventional venturi throat as shown in the drawings. A throttle blade 24 is mounted rotatably in the upper part of throat 20 on a shaft 26.

A metering chamber 28 is located in upper portion 12 adjacent the lower part of throat 20. Metering chamber 28 is separated from the throat by a portion of the venturi wall and communicates with the throat through a passage 30 extending through the wall. A short tube 32 is inserted in the throat end of passage 30 and projects for a short distance into the throat. In the illustrated embodiment, metering chamber 28 is formed by drilling from the right side of FIGURE 1 and then closing the outside opening with a plug 36.

Directly below metering chamber 28 a tube 38 extends downward from portion 12 into the fuel bowl 14 to form a fuel well. The upper end of tube 38 contains a metering jet 40 that communicates with chamber 28. Two longitudinal slots 42 and 44 (see FIGURE 2) are formed in the lower part of tube 38. A metering rod 46 having a straight portion 48 and a tapered end 50 is slidably located in jet 40. Passage 30 preferably enters metering chamber 28 at a narrow hole 33 positioned directly across chamber 28 from jet 40; this construction produces more stable fuel flow because jet 40 directs the fuel toward hole 33.

Referring to FIGURE 2, a bore 52 extends downward in the material of upper portion 12 adjacent tube 38 for a short distance. A member 54 is slidably located in bore 52 and is urged upward by a spring 56. A rod 58 is threaded into the bottom of member 54 and a pin 60 extends through yokes formed at the lower ends of rods 46 and 58, thereby connecting member 54 with metering rod 46. A clamp bracket 62 is fastened to shaft 26 by a screw 64 and locates the end of a second screw 66 in contact with the top of member 54.

A longitudinal slot 68 is cut into the wall of the upper part of throat 20 so the lower edge of slot 68 is adjacent the closed position of throttle blade 24. Behind slot 68 is a cavity 70 that communicates with metering chamber 28 through a conduit 72 (FIGURE 1). An embossment 74 projects from upper portion 12 behind slot 68 and contains a bore 76. Bore 76 communicates with cavity 70 through a metering jet 78. A piston 80 is mounted in bore 76 and has a metering rod 82 fastened thereto so rod 82 extends into the opening in jet 78. Piston 80 is spring loaded toward jet 78 by a spring 84 that seats on a cap 86. A passage 88 connects the rear of piston 80 with the engine intake manifold (not shown).

A conduit 90 connects the air horn portion of induction passage 16 with bore 76 in front of piston 80 via a conduit 92 and with cavity 70 via a conduit 94. A threaded screw 96 having a tapered end is in a metering relationship with conduit 94. Slot 68 combines with cavity 70 and conduit 72 to make up a primary air bleed passage system for chamber 28; conduit 90 combines with conduit 92, jet 78, cavity 70 and conduit 72 to make up a secondary air bleed passage system; and conduit 90 combines with conduit 94, cavity 70 and conduit 72 to make up a tertiary air bleed passage system.

OPERATION OF FIGURES 1 AND 2

The primary, secondary and tertiary air bleed systems always provide some modulation of the vacuum signal passing through passage 30 to metering chamber 28. Thus, fuel drawn into metering chamber 28 is subsequently drawn into induction passage 16 by the greater vacuum existing there. The metering signal in chamber 28 increases rapidly with increased throttle openings under road load conditions up to the point where the throttle blade has crossed slot 68, which corresponds to the point at which the enriched fuel-air ratio for idling and low speed operation ceases, and then increases at a reduced rate for higher blade openings. The rapid increase results from the reduced inlet and increased outlet to chamber 28 produced by the effect of the blade edge on slot 68; the lower rate increase results from the increased vacuum appearing in the air horn at the opening to conduit 90.

Straight portion 48 of metering rod 46 remains in a metering relationship with jet 40 until the blade crosses slot 68, and then tapered portion 50 moves into jet 40. Thus, at all times, fuel is metered into chamber 28 according to the signal therein and the position of metering rod 46.

When the engine is idling, throttle blade 24 has an edge adjacent the bottom of slot 68, and pin 60 is moved against the upper ends of slots 42 and 44 by spring 56. Metering rod 46 then has straight portion 48 in metering relationship with jet 40, thereby presenting a maximum restriction to fuel flow through the jet.

Since passage 30 opens into induction passage 16 below throttle blade 24, the high intake manifold vacuum occurring at idle is transmitted through passage 30 into metering chamber 28. Passage 88 opens into the intake manifold so the high manifold vacuum draws piston 80 to the right in FIGURE 2 until the piston seats against cap 86. Openings are provided in the skirt of piston 80 to admit a vacuum signal to the rear of the piston when it is seated.

Modulating air flow from conduit 90 reaches metering chamber 28 through both the secondary and tertiary passage systems and modulating air from slot 68 reaches the metering chamber through the primary air bleed system. Screw 96 is used to adjust the air flow in the tertiary air bleed system so the metering signal appearing in chamber 28 draws the proper amount of fuel through jet 40 at idling. The fuel and air then are drawn through passage 30 and tube 32 into induction passage 16 and are ultimately inducted into the engine. Typically, idling intake manifold vacuum is about 16 inches of mercury and the metering signal in chamber 28 is about 4 inches of water.

At a road load corresponding to 10° of throttle opening, intake manifold vacuum is approximately equal to or slightly higher than at idle, depending on engine characteristics. The metering signal in chamber 28 is increased over the signal at idle, however, because throttle blade 24 has cut off part of the air bleed through the primary air bleed system and the venturi throat is beginning to produce a signal. By calibrating the size and shape of slot 68, the increased metering signal is designed to draw the amount of fuel through jet 40 capable of satisfying the increased fuel quantity and reduced fuel-air ratio requirements of the engine. Slot 68 can be wedge shaped if desired to provide the proper amount of fuel. Similar operation meters fuel for the road load performance up to about 20° of throttle openings where the edge of the throttle blade has crossed slot 68.

Figure 6:
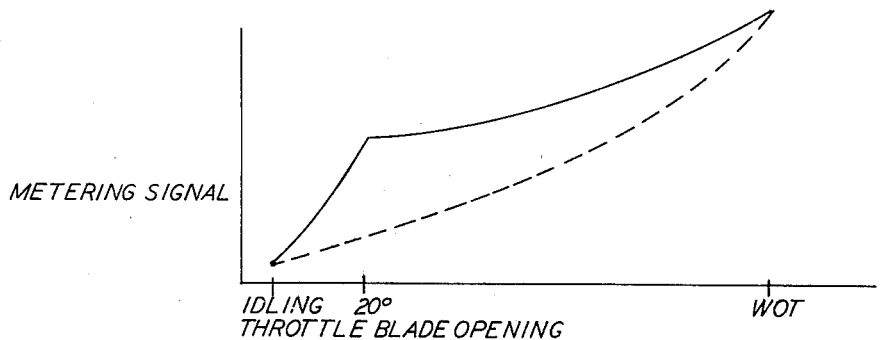
FIGURE 6 is a graph of the metering signal versus throttle blade position for both of the constructions.

For road load at higher throttle openings, the metering signal continues to increase, although at a reduced rate, by virtue of the venturi throat vacuum appearing at passage 30 and the air horn vacuum appearing at the opening of conduit 90. The solid line in FIGURE 6 shows a metering signal produced by a typical FIGURE 1 embodiment, with the knee in the curve representing the point at which the throttle blade passes the upper end of slot 68. Above the knee, the increase in the metering signal is insufficient to draw the proper amount of fuel through jet 40, so tapered portion 50 moves into a metering relationship with jet 40 and thereby reduces the restriction to fuel flow.

Whenever maximum power is demanded from the engine, intake manifold vacuum falls below about 4 inches of mercury and an enriched fuel-air ratio is necessary. This enrichment can be provided by decreasing air flow through the secondary air bleed system by the action of piston 80. Manifold vacuums above about 4 inches of mercury hold piston 80 against cap 86, but when manifold vacuum falls below this point, spring 84 moves piston 80 to the left so rod 82 reduces air flow through jet 78. Resulting in an increased metering signal in chamber 28, and consequently an increase in the fuel quantity drawn through jet 40. Alternatively, power enrichment can be provided by contouring the tip of tapered end 50 of the fuel metering rod to reduce the restriction to fuel flow.

FIGURE 5 CONSTRUCTION AND OPERATION

Figure 5:
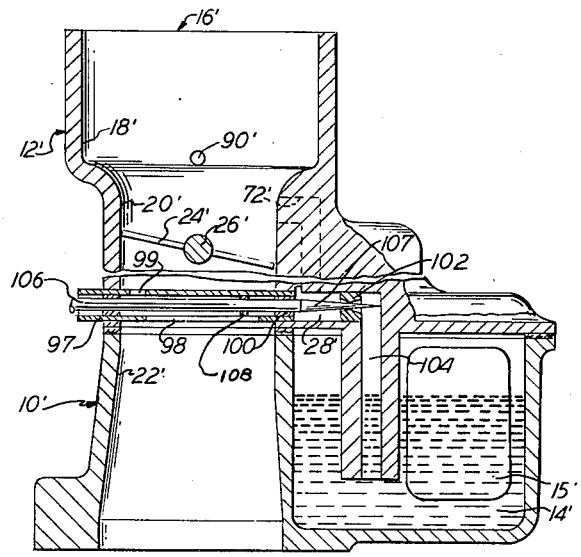
FIGURE 5 is a sectioned elevation of an alternate construction in which a single metering rod varies the metering signal and the fuel flow resistance for each throttle blade position.

The FIGURE 5 construction differs from the FIGURE 1 construction in that the metering signal in the metering chamber is determined by the position of a metering rod in the chamber outlet. Both the metering signal and the resistance to fuel flow change continuously with throttle blade opening. Structure in FIGURE 5 unchanged from the structure of FIGURES 1-4 is designated by the same number with a prime; only the changed structure is specifically described below.

Referring to FIGURE 5, a tube 97 extends through the venturi throat and terminates adjacent one end of metering chamber 28'. The central lower portion of tube 97 has an elongated slot 98 and a small hole 99 is formed on the upper surface near the exterior wall of the venturi. A fuel-air metering jet 100 is positioned in tube 97 between the venturi and the metering chamber. Tube 97 and jet 100 are located posterior of throttle blade 24', which is mounted on a shaft 26' positioned at a right angle to the axis of the jet. A fuel metering jet 102 is located at the other end of chamber 28' where it connects chamber 28' with fuel well 104. Jets 100 and 102 are on the same axis. Passage 72' connects chamber 28' with a cavity (not shown) equivalent to cavity 70. The cavity is supplied by equivalents of the secondary and tertiary air bleed systems of FIGURE 2, but is not supplied by a primary air bleed system (note the absence of a slot corresponding to slot 68). A metering rod 106 having a long tapered end portion 107 is located in tube 97 with its tapered portion extending through jets 100 and 102. Rod 106 is connected to throttle blade shaft 26' by means not shown. A collar 108 is located on the straight portion of rod 106 a short distance from tapered portion 107 where the collar is within slot 99 for all positions of rod 106. The surface between rod 106 and the outer end of tube 97 is sealed by any conventional means (not shown).

As throttle blade 24' opens, metering rod 106 is moved to the left in FIGURE 5, thereby drawing its tapered portion 108 into a metering relationship with jets 100 and 102. The metering signal in chamber 28' rises at a slightly increasing rate, as shown by the dashed line in FIGURE 6. Fuel from well 104 is drawn into chamber 28' as a function of the metering signal and the restriction to fuel flow provided by tapered portion 108 in jet 102. The fuel-air mixture formed in chamber 28' then passes through jet 100 and part of tube 97 to slot 99 where it is delivered into induction passage 16'. Collar 108 and air flowing into tube 97 from hole 99 assist in distributing the fuel.

Tapered portion 107 can have different shapes for the portions traversing jets 100 and 102 if desired. Locating shaft 26' at a right angle to the axis of rod 106 improves fuel atomization by directing air flow onto tube 97 at small throttle blade openings. Tube 97 in turn prevents this air from flowing through jet 100 into the metering chamber. The throttle blade is located far enough above tube 97 to prevent interference when the blade is fully open. Elongating venturi throat 20' will provide enough length for this clearance and also improves fuel distribution by increasing the carburetor riser length. For stable fuel flow, the fuel-air passage connecting the metering chamber with the venturi throat opens into the metering chamber at a position across the metering chamber from and approximately aligned with the jet metering fuel into the chamber; this benefit results from the lack of significant turbulence where the fuel is mixing with the air in the metering chamber.

Thus, this invention provides a carburetor having a single fuel metering system in which fuel flow always is a function of the metering signal existing in the metering chamber and the metering relationship of the metering rod to the fuel jet. The metering signal and the metering relationship can be varied considerably, as illustrated by the two disclosed constructions, so long as a change in one is accompanied by a corresponding change in the other. Fuel metering throughout the range of throttle blade openings is stable, and enrichment for idling and high power output is readily incorporated.

What is claimed is:

1. In a carburetor having a carburetor body containing an induction passage with a venturi section and a throttle blade located therein, a fuel metering system comprising
a metering chamber located in the carburetor body, said metering chamber being separated from the induction passage but communicating therewith via a fuel-air passage means, said throttle blade being located anterior to the diverging portion of the venturi section,
means for establishing a metering signal in said metering chamber less than the vacuum signal in the induction passage, said signal establishing means including an air bleed passage connecting the metering chamber with the induction passage, said air bleed passage opening into the induction passage in a longitudinally elongated area beginning adjacent the closed position of the throttle blade and extending anterior a predetermined distance, and
fuel supply means for conducting fuel to the metering chamber in response to the metering signal for all phases of engine operation.

2. The carburetor of claim 1 in which the signal establishing means comprises a secondary air bleed passage connecting the metering chamber with the atmosphere and means responsive to a signal existing posterior of the throttle blade for adjusting air flow through said secondary passage.

3. The carburetor of claim 2 in which the signal establishing means comprises a tertiary air bleed passage connecting the metering chamber with the atmosphere and means for adjusting air flow through said tertiary passage.

4. The carburetor of claim 3 comprising valve means for controlling fuel flow through said fuel supply means to the metering chamber and linkage connecting said valve means with the throttle blade, said valve means comprising a metering rod having a straight portion and a tapered portion with the straight portion located in metering relationship with a metering jet when the throttle blade is in closed and partially opened positions.

5. The carburetor of claim 4 in which the fuel-air passage means opens into the metering chamber at a position across the chamber from and at least approximately aligned with said metering jet.

6. The carburetor of claim 5 in which the venturi section has an elongated throat and the throttle blade is mounted in the throat.

7. The carburetor of claim 1 in which the fuel-air passage means is coaxial with the opening of the fuel supply means into the metering chamber with the axis thereof projecting through the carburetor induction passage at a right angle to the axis of the throttle blade shaft, and comprising a metering rod movable along the axis of the passage means, said metering rod being in a metering relationship with the fuel-air passage means and the fuel supply means.

8. The carburetor of claim 7 comprising a hollow tube coaxial with the metering rod and extending into the induction passage from the opening of the fuel-air passage into the induction passage, said tube opening into said induction passage and said metering rod being movable in said tube.

9. The carburetor of claim 8 in which said tube extends across the induction passage and has an elongated opening in its downstream side within the induction passage, and said metering rod has a diameter considerably smaller than the inside diameter of said tube, said rod having a collar located in said elongated opening for all operating positions of said rod.

10. A carburetor for an internal combustion engine comprising
a carburetor body containing a fuel metering chamber and an induction passage having a venturi section, said venturi section having an elongated throat and said metering chamber communicating via a fuel-air passage means with the posterior portion of said throat,
passage means for establishing a metering signal in said metering chamber, said passage means including a primary conduit connecting said metering chamber with the anterior portion of the venturi throat, said passage means including a secondary conduit connecting the metering chamber with the induction passage anterior of the venturi section,
means responsive to a signal existing posterior of the throttle blade for adjusting air flow through said secondary conduit,
throttle blade means located in said venturi section posterior of said conduit but anterior of the point at which the metering chamber communicates with said throat, fuel supply means for conducting fuel to the metering chamber, said fuel-air passage means opening into said metering chamber at a position across the metering chamber from and coaxial with the opening of said fuel supply means into the metering chamber, the axis of said fuel-air passage means projecting through the carburetor induction passage at a right angle to the axis of the throttle blade shaft, and a metering rod movable along the axis of the passage means, said metering rod being in a metering relationship with the fuel-air passage means and the fuel supply means.

11. The carburetor of claim 10 comprising a hollow tube coaxial with the metering rod and extending into the induction passage, said tube opening into said induction passage and said metering rod being movable in said tube.

12. A carburetor for an internal combustion engine comprising a carburetor body containing a fuel metering chamber and an induction passage having a venturi section, said venturi section having an elongated throat and said metering chamber communicating via a fuel-air passage means with the posterior portion of said throat, passage means for establishing a metering signal in said metering chamber, said passage means including a primary conduit connecting said metering chamber with the anterior portion of the venturi throat, said passage means including a secondary conduit connecting the metering chamber with the induction passage anterior of the venturi section, means responsive to a signal existing posterior of the throttle blade for adjusting air flow through said secondary conduit, fuel supply means for conducting fuel to the metering chamber, throttle blade means located in said venturi section posterior of said conduit but anterior of the point at which the metering chamber communicates with said throat, and valve means for controlling fuel flow through said fuel supply means and linkage connecting said valve means with the throttle blade, said valve means comprising a metering rod having a straight portion and a tapered portion with the straight portion located in metering relationship with a metering jet when the throttle blade is in closed and partially opened positions.

References Cited
UNITED STATES PATENTS

| | | | |
|---|---|---|---|
| 2,197,476 | 4/1940 | Lichtenstein | 261—50 |
| 2,269,277 | 1/1942 | Lichtenstein | 261—50 X |
| 2,595,720 | 5/1952 | Snyder | 261—64.2 |
| 2,801,835 | 8/1957 | Read | 261—51 |
| 3,347,536 | 10/1967 | Sutton | 261—50 X |

TIM R. MILES, Primary Examiner

U..S. Cl. X.R.

261—64, 121